United States Patent

Nordentoft

[11] 4,051,870
[45] Oct. 4, 1977

[54] SINGLE HANDLE MIXER VALVE
[75] Inventor: Lars Nordentoft, Menden, Germany
[73] Assignee: Friedrich Grohe Armaturenfabrik, Hemer, Germany
[21] Appl. No.: 661,349
[22] Filed: Feb. 25, 1976
[30] Foreign Application Priority Data
Feb. 28, 1975 Germany .......................... 2508724
[51] Int. Cl.² ........................................ F16K 11/18
[52] U.S. Cl. ................................ 137/636.2; 251/50; 251/251
[58] Field of Search ............... 137/607, 636–636.4, 137/609

[56] References Cited
U.S. PATENT DOCUMENTS

| 1,573,210 | 2/1926 | Whidden | 137/607 X |
| 1,936,236 | 11/1933 | Hill | 251/50 X |

FOREIGN PATENT DOCUMENTS

| 388,900 | 1/1924 | Germany | 137/636.2 |
| 119,017 | 3/1970 | Norway | 137/636.2 |

Primary Examiner—Martin P. Schwadron
Assistant Examiner—Richard Gerard
Attorney, Agent, or Firm—James B. Raden; William J. Michals

[57] ABSTRACT

A mixer valve is disclosed for mixing hot and cold water, and controlling the outflowing volume by means of a single handle. The invention includes a control device outside the area to which water is admitted in the headpiece of the valve body and a wobble plate in the headpiece to control valve pistons. The wobble plate is carried by an axle bolt arranged on a secant in a bushing rotating around a fixed axis and being adjustable in its oblique position and its rotating setting by means of a lever assembly mounted in the bushing vertical to the rotational axis with an eccentric part engaging the wobble plate. The valve pistons preferably are tear-shaped and are mounted in spring tight suspension with the incoming water in the closing direction and housed and sealed by means of piston rods in the valve body with the piston rods in contact with the wobble plates at their top end-pieces.

3 Claims, 3 Drawing Figures

SINGLE HANDLE MIXER VALVE

CROSS REFERENCE TO RELATED APPLICATION

Attention is directed to application Ser. No. 661,348 filed of even date herewith in the name of Lars Nordentoft, covering a related "Single Handle Mixer Valve".

BACKGROUND OF THE INVENTION

1. Field of the Invention

The invention relates to a mixer valve and, in particular, to a valve for mixing hot and cold water. It includes a valve device having movable valve pistons and a wobble plate, by means of which mixer valve, the mixture ratio and the outflowing volume can be set by means of a single handle.

2. Description of the Prior Art

A mixer valve of this type is known in which the mixture is regulated by the swivel action of an elbow-type headpiece. This swivel action causes a wobble plate to turn in relation to the two valve pistons to regulate the incoming flow of hot and cold water and thereby allows varying flow cross-sections through. The volume is regulated by screwing in a handle mounted on the headpiece in which handle a tappet swings the wobble plate into the horizontal. Furthermore, a mixer valve is known in which an elbow-type headpiece with screw-type handle is replaced by a lever-type handle which causes the tappet to tilt the wobble plate by means of an eccentric.

A major disadvantage of the known embodiments of the prior art is that the relatively complicated control mechanism, in particular, the swivel or wobble plate with its axial mounting and the slide faces for the valve pistons at the actuating tappets is located in a chamber to which water is admitted. For this reason, impurities such as lime precipitation and the like, from the water enter the control mechanism so that it develops difficulties after a short period of time in operation and is subjected to heavy wear. Moreover, the valve cones of the known mixer valves are closed against the pressure in the water mains so that a relatively high closing force has to be exerted on the valve cone by the control mechanism to provide a good seal, thereby promoting premature wear. Finally, the inlet valves are flat or disc valves which divert the water sharply under flow and spin, thereby tending to cause an undesired noise source when water is being drawn.

BRIEF DESCRIPTION OF THE INVENTION

The invention is based upon creating a mixer valve which would avoid the disadvantages of the mixer valves described above and which can be produced at reasonable cost from a few, uncomplicated parts ensuring a long service life.

According to the invention, this is brought about by a combination envolving positioning that part of the valve device incorporating the control device outside the area to which water is admitted in the headpiece of the valve body and by providing a wobble plate in the headpiece to control the valve pistons. This wobble plate is carried by an axle bolt arranged in a secant in a bush rotating about a fixed axis. The wobble plate is made adjustable in its oblique position and its rotating setting by means of a lever assembly mounted in the bush vertical to the rotational axis with an eccentric part. The valve pistons preferably are formed in tear shape and are mounted in spring-tight suspension with the incoming water in the closing direction and by housing them, sealed, by means of piston rods in the valve body and by arranging for the piston rods to contact the wobble plates at their top endpieces.

The embodiment in accordance with the invention ensures that the control mechanism is kept free of impurities and even makes it possible to improve its functioning by administering a lubricant thereto. Also, the valve pistons in accordance with the invention are, in the main, under stress from the mains pressure in the closed position so that only the considerably lesser forces required to open the valve pistons load the control mechanism. The tear-shaped formation of the valve pistons allows the mixer valve to be operated at a low noise level.

The damping pistons coupled to the valve pistons prevent water shock caused by sudden closure of the mixer fitting. This provides for good reliability and long service life of the mixer valve.

DESCRIPTION OF THE DRAWINGS

An example of an embodiment of the invention is shown in the illustrations and will be described below in greater detail in connection with the drawings, in which.

DESCRIPTION OF A PREFERRED EMBODIMENT

Figure 1:
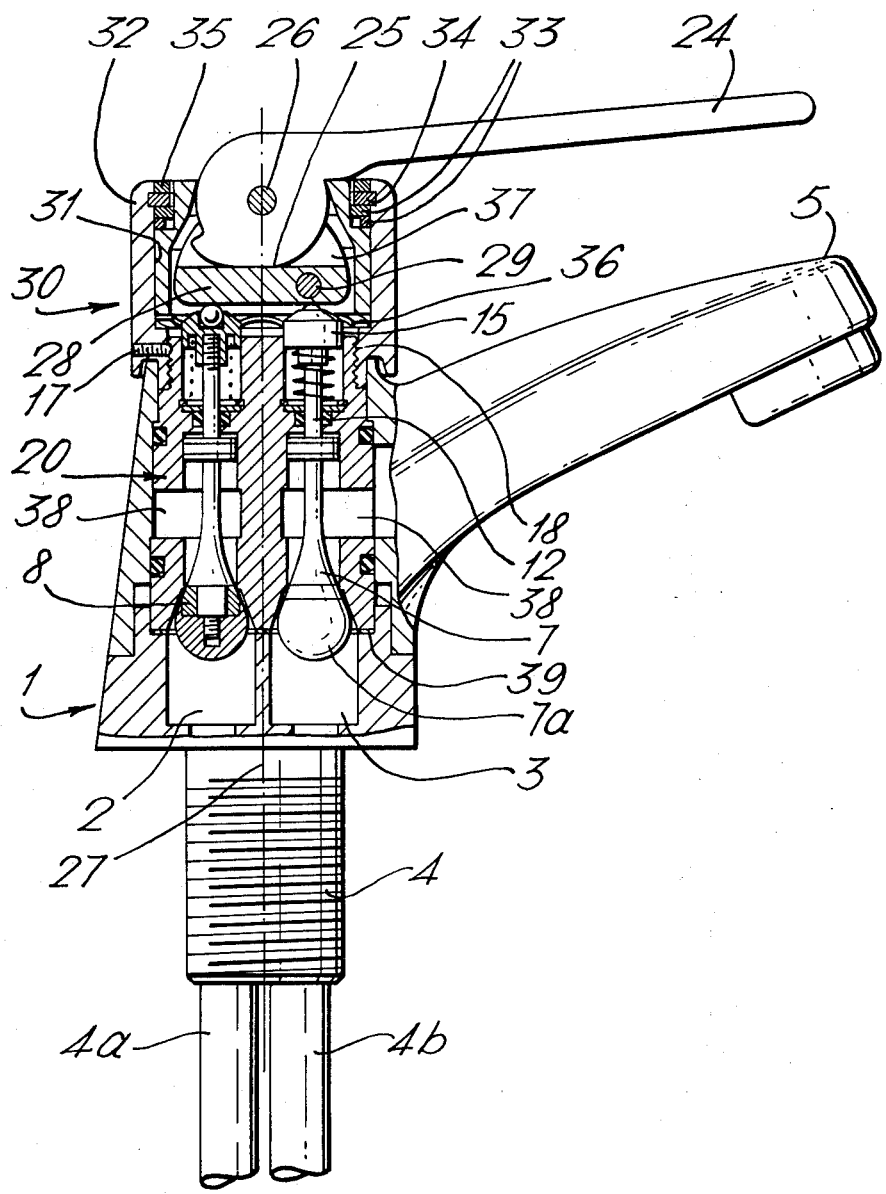
FIG. 1 shows a longitudinal partially sectional view through a mixer valve in accordance with the invention.

The mixer valve as shown in FIG. 1 consists of a base part 1, a middle part 20 and a headpiece 30. The base part 1 includes a support 4 by means of which the mixer valve can, for example, be fastened to a wash unit. The spout 5 is mounted on the base part 1 pivotally sealed with sealing rings 5a (see FIG. 2). The water supply pipes 4a and 4b for hot and cold water are introduced through the support and enter the passages 2 and 3 provided in the base part 1.

Figure 2:
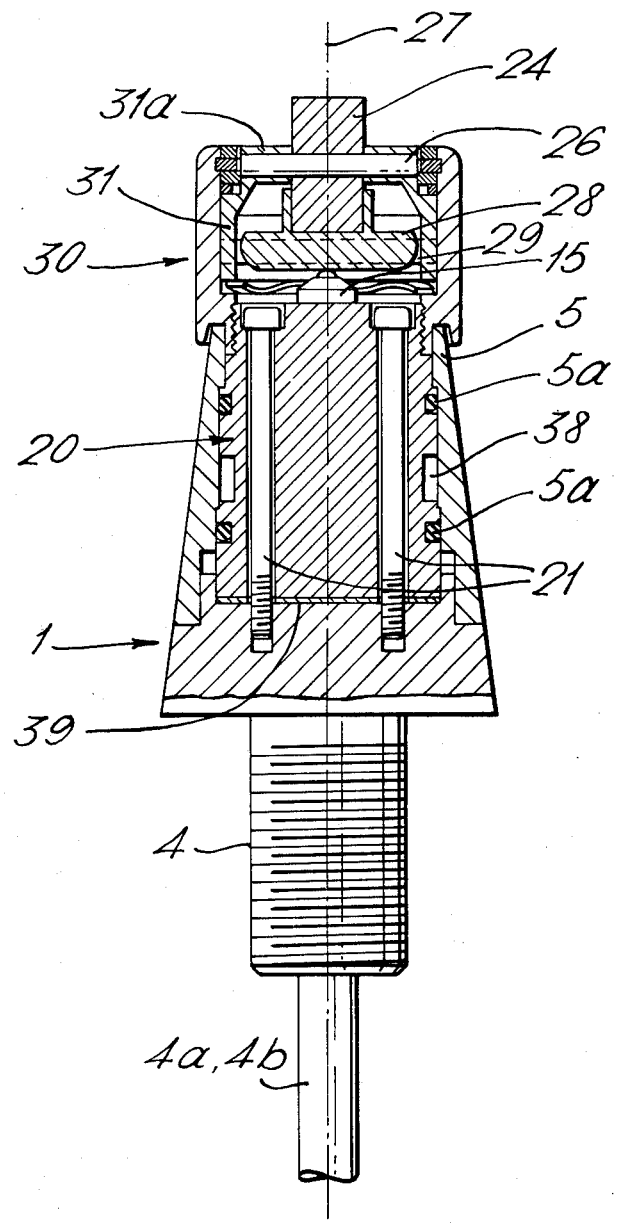
FIG. 2 shows a longitudinal section through the mixer valve shown in FIG. 1, turned through 90°.
Figure 3:
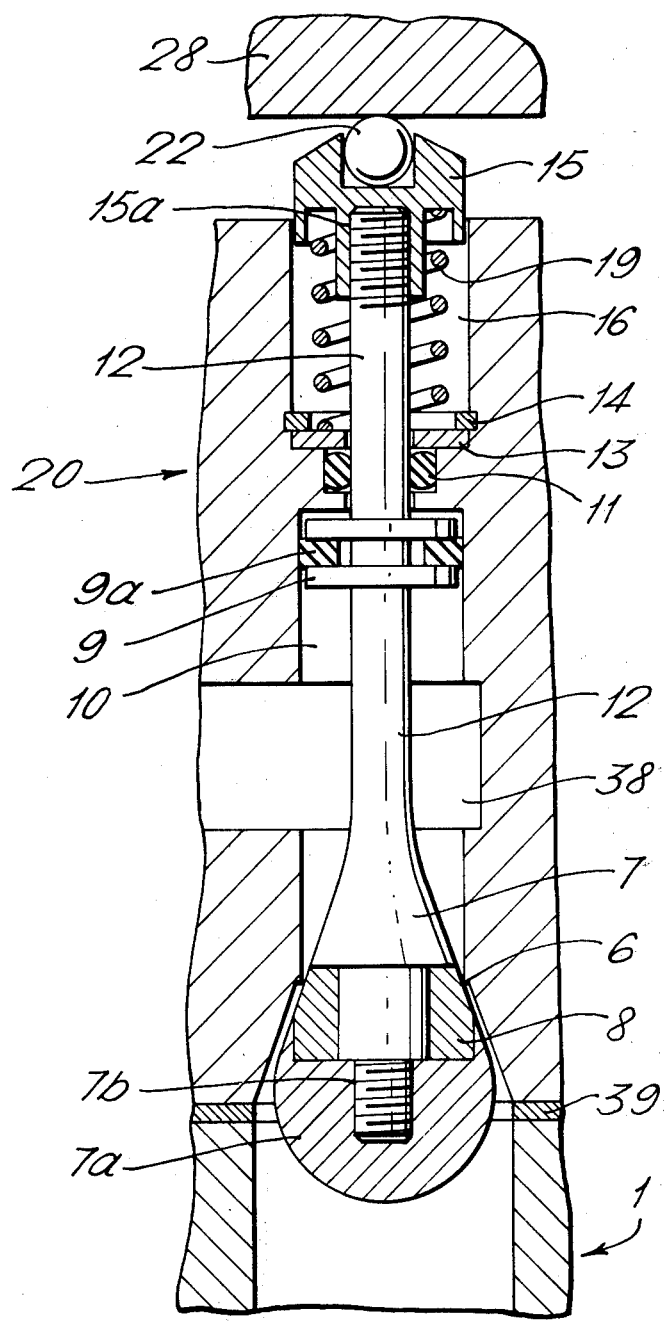
FIG. 3 shows a valve piston on a larger scale in a section taken from FIG. 1.

The middle part 20 is secured in the base part preferably using two straining screws 21 and is made leak-proof by interposing a seal 38 (see FIG. 2). Two tear-shaped piston valves 7 are mounted in parallel bore-holes in the middle part and these valve pistons each work in conjunction with a valve seat 6 in the middle part 20, as indicated most clearly in FIG. 3. To accommodate the sealing ring 8 securely, the valve pistons are formed in two parts, part 7a is formed as a shaped nut which is screwed on to the joining piece 7b of the valve piston and thus securely holds the sealing ring on the valve piston 7. Each valve piston is guided absolutely central to the valve seat 6 by the mounting of the piston rod 12 in the middle part 20 and of the end-piece 15 in the bore-hole 16.

To prevent the piston valves from closing suddenly, damping pistons 9, which prevent rapid closure by means of a throttle gap in the piston ring 9a, are mounted on the piston rods 12 in cylinder bore-holes 10 connected to a mixing chamber 38.

The piston rods are supported in the middle part 20 and sealed with O-rings 11. To ensure proper positioning of the sealing rings 11 in the middle part, the rings are secured with cover washers 13 and spring rings 14.

At their upper ends, the piston rods support enlarged end-pieces 15, which are secured to the piston by the threads 15a. To ensure that the valve pistons are securely held in the closed position when the valve is not actuated and when the water pressure fails, a helical spring 19 is fitted between each of the thickened end pieces 15 and the cover washers 13.

Turning to FIG. 1, it will be seen that the headpiece 30 is screwed to the thread 18 on the middle part 20 and is secured against turning by a radially-positioned grub-screw 17. A bushing 31 is pivotally mounted in the casing 32 and is secured axially by means of a spring ring 34 and sliding rings 33. The bushing is restrained by a spring washer 36 in the housing 32 to provide a secure and play-free support on the sliding ring. A wobble or control plate 28 is supported in the bushing 31 by an axle-bolt 29. The axle-bolt 29 is arranged on a secant at right angles outside the swivel axis 27 of the bushing 31. The flat bottom surface of the wobble plate 28 rests on the enlarged end-pieces 15. To reduce the amount of friction between the plate 28 and the piston rods 12, the end-pieces 15 are fitted with balls 22 guided in boreholes. On the opposite side of the wobble plate, an eccentric part 25 on the lever assembly 24 engages in a slitlike recess 37 the eccentric part being of the self-locking type and thus retaining the wobble plate in every setting. The lever assembly 24 is also carried by an axle-bolt 26 parallel to the axle-bolt 29 and at right angles to the pivoting axis of the bush 27. To provide a good hold for the eccentric part 25, a slit-like aperture is provided on the end face 31a of the bushing 31. A covering ring 35 is provided as a closure for the annular groove for the spring ring 34 which is visible from above.

The function of the mixer valve is as follows: Hot and cold water is passed to the tear-shaped valve pistons 7 from the mains supply 4a and 4b through the passages 2 and 3. To draw the water off, only the lever 24 is raised so that the eccentric part 25 lowers the wobble plate 28 into an oblique position and thereby, as shown in FIG. 1, brings only the valve piston in the passage 2 into the open position so that the incoming water, e.g. hot water, can enter the mixing chamber 38 and can leave the mixer valve through the spout 5.

By swiveling the handle 24 through 180°, the same would occur with the valve piston in the passage 3 so that in this case only cold water would be drawn off. If the lever assembly 24 is swiveled through 90° so that the axis 29 of the wobble plate 28 is parallel to the connecting line between the two valve pistons, both valve pistons are evenly lowered during the drawing-off process. In this way, equal amounts of hot and cold water can enter the mixing chamber 38 to be mixed and to emerge through the spout 5 as mixed water. The required mixed water temperatures can thus be obtained by setting the lever to the appropriate intermediate position in the swivel range.

The swivel movement can be limited by providing stops at the bushing 31 (not illustrated) — such as a recess on the surface area of the bushing to accommodate a locking screw screwed into the housing 32.

The overall volume of mixed water emerging can be controlled by raising or lowering the lever assembly 24.

A lubricant can be introduced into the casing 32 of the headpiece 30 to increase the movability and service life of the mixer valve. The tear-shaped form of the valve piston serves to reduce the noise level of the water flowing in the mixer valve to a minimum. The damping pistons 9 prevent sudden closure of the piston valve which could be caused by a water shock in the mains and which can cause damage to the piping apart from creating unpleasant noises.

The illustrated embodiment of the invention pertains to a single-outlet mixer valve with a swiveling spout. It is obvious that mixer valves in accordance with the invention can also be used in mixer banks of the most varied types.

I claim:

1. A mixer valve for mixing hot and cold water sources and providing an output thereof and under the control of a single lever comprising, in combination:
    a valve housing;
    first and second inlets on said housing for respectively receiving said sources and said inlets respectively communicating with first and second passageways in said housing;
    a mixing chamber in said housing in which said first and second passageways terminate at restricted openings therein and said chamber having an outlet opening;
    first and second valve members respectively disposed in said first and second passageways, each valve member having a stem extending through said chamber, through restricted bores in said housing and externally of said valve housing, and each valve member having a tapered configuration which reduces in the direction of said stem, wherein the restricted openings of said chamber form valve seats for receiving the tapered portions of said valve members in sealing relationship therewith;
    means for yieldably urging said valve members toward said valve seats;
    a valve cap removably mounted to said valve housing and surrounding the extended ends of said valve stems;
    a bushing member rotatably mounted in said valve cap and about an axis which is parallel to the axes of said valve stems;
    a control plate pivotally mounted in said bushing about an axis which is spaced-apart from the axis of said bushing member and perpendicular to the axes of said valve stems and being translatable for engaging one or both of the extended ends of said valve members in accordance with the angular position of said bushing member; and
    a control lever pivotally mounted in said bushing above said control plate and about an axis which is parallel to the pivotal axis of said control plate, said control lever having an eccentric cam surface extending about its pivotal axis for engaging said control plate wherein the plurality of angular positions of said control lever about its pivotal axis and the axis of said bushing member selectively translate one or both of said valve stems away from said valve seats in accordance with the angular position of said bushing member and said eccentric cam surface thereby to control the mixing and output of said hot and cold water.

2. The mixer valve according to claim 1, wherein the ends of said valve members which face said inlets are terminated as hemispheres, thereby to reduce the noise level of the water flowing in said mixer valve.

3. The mixer valve according to claim 1, wherein said restricted bores comprise cylinders and wherein said stems include concentrically mounted dampening pistons sealingly and slidably engaging the walls of said cylinders.

* * * * *